United States Patent Office 2,959,593
Patented Nov. 8, 1960

2,959,593

3,5-DIOXO-PYRAZOLIDINES

Ernst Jucker, Binningen, Basel-Land, and Anton Ebnother and Erwin Rissi, Basel, Switzerland, assignors to Sandoz Ltd., Basel, Switzerland No Drawing. Filed June 9, 1959, Ser. No. 819,011

Claims priority, application Switzerland June 19, 1958

7 Claims. (Cl. 260—294)

The present invention relates to 3,5-dioxo-pyrazolidine derivatives having the general formula:

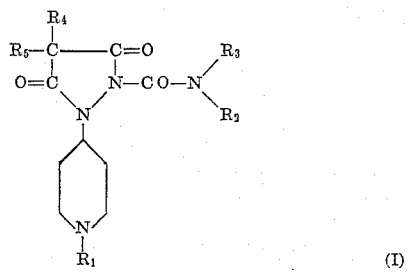

wherein each of $R_1$, $R_2$ and $R_3$ is a lower alkyl group (e.g. methyl, ethyl, propyl, butyl, etc.), $R_4$ is a hydrogen atom or a lower alkyl, aryl (e.g. phenyl, lower alkylphenyl, etc.) or aralkyl (e.g. benzyl, phenylethyl, etc.) group and $R_5$ stands for a lower alkyl, aryl or aralkyl group.

The aforesaid 3,5-dioxo-pyrazolidine derivatives of Formula I are prepared, according to this invention, by condensing a 1-alkyl-4-piperidone of the formula

with a 4,4-dialkyl-semicarbazide of the formula:

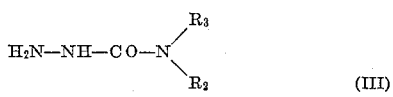

to produce a semicarbazone of the formula:

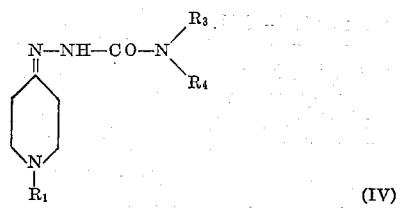

wherein each of $R_1$, $R_2$ and $R_3$ has the above significance. The semicarbazone is then reduced to a semicarbazide derivative having the formula:

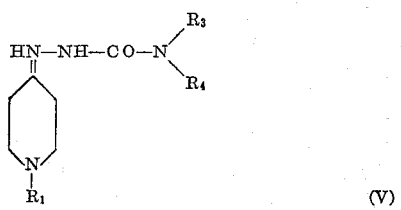

wherein $R_1$, $R_2$ and $R_3$ have the above significance and the so-obtained semicarbazide is converted with a reactive derivative of malonic acid of the formula

wherein $R_4$ and $R_5$ are as precedingly defined and X and Y stand for chlorine, bromine, O-alkyl, $NH_2$ or $N_3$ to give the compounds corresponding to the general Formula I.

More particularly, the process of producing said compounds I can, for example, be carried out as follows: A semicarbazone produced by reacting 1-methyl-4-piperidone with 4,4-dimethyl-semicarbazide is reduced with catalytically activated hydrogen to the corresponding 1-(1'-methyl-piperidyl-4')-4,4-dimethyl-semicarbazide. The so-obtained semicarbazide is then reacted in an inert solvent, such for example, as chloroform or tetrahydrofurane with a solution of diethylmalonyl dichloride in the same solvent while cooling is effected and in the presence of a tertiary base, such for example, as triethylamine. The reaction product of Formula I can be isolated from the reaction mixture and purified by known methods. The 3,5-dioxo-pyrazolidine derivatives of Formula I may be converted to the corresponding salts by reaction with inorganic or organic acids by known methods.

The new 3,5-dioxo-pyrazolidine derivatives prepared according to the present invention are, at room temperature (about 20° to about 30° C.), solid crystalline bases which form physiologically acceptable stable salts with organic or inorganic acids. Thus, e.g. with hydrochloric acid, hydrobromic acid, phosphoric acid, acetic acid, benzoic acid, citric acid, tartaric acid, methanesulfonic acid, etc., they form the corresponding hydrochlorides, hydrobromides, phosphates, acetates, benzoates, citrates, tartrates, methanesulfonates, etc. The new compounds—salts as well as free bases—possess pharmacodynamic properties which make them useful medicaments. Thus they exhibit an anti-inflammatory as well as a specifically anti-rheumatic activity while being distinguished by good local tolerability. These new compounds are superior to all hitherto known anti-inflammatory drugs in that they exhibit considerable therapeutic activity even when administered in low dosage only. In known anti-inflammatory compounds such low dosages would not prove therapeutically active at all. The new compounds are thus useful for therapeutic purposes, e.g. in the treatment of inflammation due to arthritis of the joints, rheumatism, etc. They are also useful as intermediates for the preparation of drugs.

The hitherto unknown semicarbazide derivatives obtained in the form of intermediates according to the present invention and corresponding to the general Formula V are, at room temperature, crystalline bases. Together with organic or inorganic acids they form stable salts which crystallize at room temperature.

The following examples represent presently-preferred embodiments of the invention and are intended to illustrate the invention but not at all to restrict the scope thereof. All temperatures are given in degrees centigrade. Parts by weight bear the same relationship to parts by volume as do grams to milliliters. Percentages are by weight.

*Example 1*

To a solution of 9.1 parts by weight of 4,4-dimethyl-semicarbazide in 90 parts by volume of ethanol, there is added dropwise and at room temperature a solution of 10.0 parts by weight of N-methyl-4-piperidone in 25 parts by volume of ethanol. The mixture is boiled under reflux for 2 hours with stirring and evaporated to dryness under reduced pressure. The crude product is dissolved in 100 parts by volume of glacial acetic acid or 2-normal hydrochloric acid and hydrogenated in the presence of 0.800 part by weight of platinum oxide catalyst at room temperature and at atmospheric pressure. The solution is separated from the catalyst by filtration and is then evaporated to dryness under reduced pressure. The thickly liquid residue is dissolved in approximately 70 parts by volume of water. The solution is cooled with ice and treated with excess solid potassium carbonate. The free bases are extracted with chloroform. The extract is dried over sodium sulphate and the solvent is evaporated under reduced pressure. Pure 1-(1'-methylpiperidyl-4')-4,4-dimethyl-semicarbazide

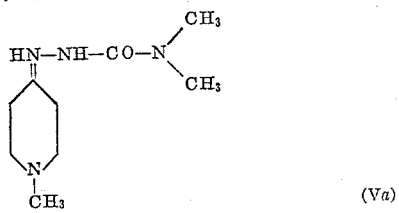

(Va)

is recrystalilzed twice from methylene-chloride/ether and melts at 133.5–136.5°.

To a solution of 10.0 parts by weight of diethylmalonyl dichloride in 50 parts by volume of chloroform there is added quickly and while cooling with ice a solution of 10.15 parts by weight of 1-(1'-methyl-piperidyl-4')-4,4-dimethyl-semicarbazide in 100 parts by volume of chloroform. 27 parts by volume of triethylamine are added very slowly while cooling with ice and the mixture is boiled under reflux for 6 hours.

The solvent is removed in vacuo, the residue is taken up in 100 parts by volume of water, acidified with hydrochloric acid and the slightly turbid solution is extracted twice with methylene chloride. The solution, now being clear, is extracted with excess solid potassium carbonate while cooling with ice is effected. The free bases are extracted with chloroform, the extract is dried over sodium sulphate and the solvent is evaporated in vacuo. In order to remove the last traces of excess triethylamine, the residue is heated to 100° for two hours under reduced pressure. The thickly liquid residue is then dissolved in methanol. Hydrogen chloride is passed into the solution until acid to Congo. After evaporation to dryness in vacuo, the residue is recrystallized twice from ethanol/ether. The obtained pure 1-(1'-methyl-piperidyl-4')-2-(N-dimethylcarbamyl)-4,4 - diethyl - 3,5 - dioxo- pyrazolidine hydrochloride

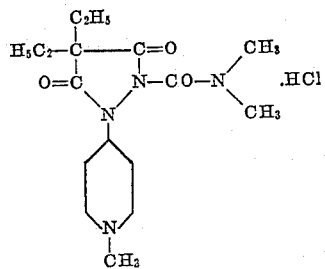

(Ia)

melts at 255.5–257.5° (with decomposition).

*Example 2*

1-(1'-methyl - piperidyl - 4') - 4,4 - dimethyl - semicarbazide is first prepared according to the procedure described in the first paragraph of Example 1.

A solution of 14.65 parts by weight of diphenylmalonyl dichloride in 130 parts by volume of tetrahydrofurane is treated quickly and while cooling with ice with a solution of 10 parts by weight of 1-(1'-methyl-piperidyl-4')-4,4-dimethyl-semicarbazide in 200 parts by volume of tetrahydrofurane. Subsequently 17 parts by volume of triethylamine are added dropwise. The mixture is boiled for 6 hours while stirring vigorously. After cooling, the precipitate of triethylamine hydrochloride which has formed is separated by filtration. The clear filtrate is evaporated to dryness in vacuo and the crystalline residue is recrystallized twice from ethanol. The obtained pure 1-(1'-methyl-piperidyl-4')-2-(N-dimethyl-carbamyl)-4,4-diphenyl-3,5-dioxo-pyrazolidine

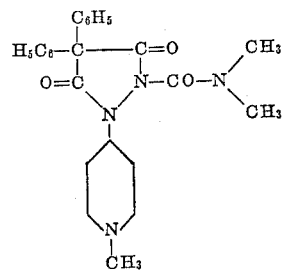

(Ib)

melts at 180–183° (with slight decomposition).

To prepare the hydrochloride, 14.72 parts by weight of the free base are dissolved in 75 parts by volume of chloroform and treated with 36 parts by volume of approximately normal methanolic hydrochloric acid. After evaporation to dryness under reduced pressure, the crystalline residue is recrystallized twice from 95 percent ethanol. The pure hydrochloride melts at 267–273° (with decomposition).

*Example 3*

1-(1'-methyl-piperidyl-4')-4,4-dimethyl - semicarbazide is first prepared according to the procedure described in the first paragraph of Example 1.

A solution of 11.0 parts by weight of dimethylmalonyl dichloride in 80 parts by volume of tetrahydrofurane is treated rapidly and while cooling with ice with a solution of 13.0 parts by weight of 1-(1'-methyl-piperidyl-4')-4,4-dimethyl-semicarbazide in 200 parts by volume of tetrahydrofurane. Subsequently 25 parts by volume of triethylamine are added dropwise. The mixture is boiled for 6 hours and after cooling, the precipitate of triethylamine hydrochloride which has formed is separated by filtration. The clear filtrate is evaporated to dryness in vacuo and the crystalline residue is recrystallized twice from ethanol/ether. The pure 1-(1' - methyl - piperidyl - 4')-2-(N-dimethyl-carbamyl)-4,4-dimethyl-3,5-dioxo-pyrazolidine

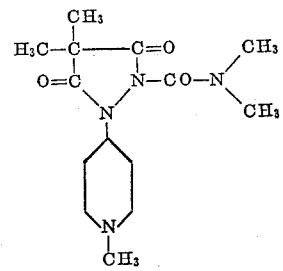

(Ic)

melts at 134–136°.

To prepare the hydrochloride, the methanolic solution of the free base is treated with an equal amount of methanolic hydrochloric acid. After evaporation to dryness, the residue is recrystallized from ethanol. The pure hydrochloride melts at 267–270° (with decomposition).

*Example 4*

1-(1'-methyl-piperidyl-4')-4,4-dimethyl - semicarbazide is first prepared according to the procedure described in the first paragraph of Example 1.

10 parts by weight of diethylmalonyl dichloride are added dropwise in the course of 30 minutes and while cooling with ice to 30 parts by volume of hydrazine hydrate, whereupon a colorless precipitate separates out immediately. After stirring the reaction mass for 10 minutes, the precipitate is separated by filtration, washed with a small quantity of hydrazine hydrate and then pressed thoroughly. The so-obtained diethylmalonic acid dihydrazide is recovered, after recrystallization from absolute ethanol, in the form of platelets which, upon rapid heating to about 140°, melt with evolution of hydrazine. Upon slow heating, they melt at 255–265°.

While stirring and cooling with ice, a solution of 3.45 parts by weight of sodium nitrite in 10 parts by volume of water is added dropwise to a solution of 4.7 parts by weight of diethylmalonic acid dihydrazide in 50 parts by volume of normal hydrochloric acid. Thereupon 50 parts by volume of ether are added and stirring is continued for another 20 minutes. The precipitate which separates out is filtered off. The ether layer is separated from the filtrate and is washed with sodium bicarbonate solution and sodium chloride solution, after which it is dried over sodium sulphate.

A solution of 4.6 parts by weight of 1-(1'-methyl-piperidyl-4')-4,4-dimethyl-semicarbazide in 40 parts by volume of ether is added dropwise with stirring and while cooling with ice to the dried ether solution. Stirring is continued for 6 hours. The mixture is allowed to stand for three days and finally heated to boiling under reflux for 4 hours. The supernatant solution is decanted and the colorless oily precipitate is taken up in chloroform. The solution is dried over sodium sulphate and the solvent is evaporated under reduced pressure. The thickly liquid residue is dissolved in methanol. Hydrogen chloride is passed in until the solution is acid to Congo. After working up as described in Example 1 the hydrochloride (Ia) melts at 253–255° (with decomposition).

*Example 5*

1-(1'-methyl-piperidyl-4')-4,4-dimethyl-semicarbazide is first prepared according to the procedure described in the first paragraph of Example 1.

18.5 parts by weight of 1-(1'-methyl-piperidyl-4')-4,4-dimethyl-semicarbazide and 13.0 parts by weight of dimethylmalonic acid diamide are introduced into a solution of 5.5 parts by weight of sodium in 150 parts by volume of absolute ethanol. The ethanol is distilled off under atmospheric pressure and the remaining residue is heated for 5 hours at a bath temperature of 170°, using a condenser. The reaction mixture is then dissolved in ethanol, filtered and excess solid carbon dioxide is added to the filtrate. The resultant precipitated salts are filtered off and the filtrate is evaporated to dryness under reduced pressure. Fractional crystallization of the so-obtained residue from ethanol/ether yields a pure compound which is identical with the compound described in Example 3.

*Example 6*

1-(1'-methyl-piperidyl-4')-4,4-dimethyl-semicarbazide is first prepared according to the procedure described in the first paragraph of Example 1.

18.5 parts by weight of 1-(1'-methyl-piperidyl-4')-4,4-dimethyl-semicarbazide and 17.5 parts by weight of diethylmalonic acid ethyl ester amide are introduced into a solution of 5.5 parts by weight of sodium in 150 parts by volume of absolute ethanol. The ethanol is distilled off under atmospheric pressure and the remaining residue is heated for 5 hours at a bath temperature of 170°, using a condenser. The reaction mixture is then taken up in ethanol, filtered and excess solid carbon dioxide is added to the clear filtrate. The resultant precipitated salts are filtered off and the filtrate is evaporated to dryness under reduced pressure. The filtrate is worked up and the base converted to the hydrochloride (Ia) in the way described in Example 1. M.P. 254–256.5° (with decomposition).

*Example 7*

1-(1'-methyl-piperidyl-4')-4,4-dimethyl-semicarbazide is first prepared according to the procedure described in the first paragraph of Example 1.

92.5 parts by weight of 1-(1'-methyl-piperidyl-4')-4,4-dimethyl-semicarbazide and 94 parts by weight of dimethylmalonic acid diethyl ester are introduced into a solution of 25 parts by weight of sodium in 500 parts by volume of absolute ethanol. The ethanol is distilled off under atmospheric pressure and the remaining residue is heated for two hours at a bath temperature of 180°, using a condenser. The solid reaction mixture is then taken up in plenty of ethanol and the solution filtered off from any undissolved substance. Excess solid carbon dioxide is added to the clear filtrate. The resultant precipitated salts are filtered off and the filtrate is evaporated to dryness under reduced pressure. After recrystallization from ethanol/ether, the obtained 1-(1'-methyl-piperidyl-4')-2-(N-dimethyl-carbamyl) - 4,4 - dimethyl-3,5-dioxo-pyrazolidine melts at 132–135° and is identical with the compound described in Example 3.

*Example 8*

1-(1'-methyl-piperidyl-4') - 4,4 - dimethyl-semicarbazide is first prepared according to the procedure described in Example 1. 10 parts by weight of this compound and 14.6 parts by weight of diethylmalonyl dibromide are used to prepare 1-(1'-methyl-piperidyl-4')-2-(N-dimethyl-carbamyl)-4,4-diethyl - 3,5 - dioxo-pyrazolidine in the presence of triethylamine. The hydrochloride is identical with the compound described in Example 1.

*Example 9*

1-(1'-methyl-piperidyl-4') - 4,4-dimethyl-semicarbazide is first prepared according to the procedure described in the first paragraph of Example 1.

To a solution of 8 parts by weight of n-butylmalonyl dichloride in 40 parts by volume of absolute chloroform there is added dropwise and with stirring at 0–10° first a solution of 8 parts by weight of 1-(1'-methyl-piperidyl-4')-4,4-dimethyl-semicarbazide in 40 parts by volume of absolute chloroform and then 11 parts by volume of triethylamine. Stirring is continued at room temperature for another hour and the mixture is then boiled for 4 hours under reflux. The chloroform solution is shaken out 3 times with 25 parts by volume of water each time and the aqueous extract is evaporated to dryness in vacuo. The residue is dissolved in a little warm isopropanol and slowly treated with ether; the greater part of the triethylamine hydrochloride thus crystallizes out. The mother liquor is evaporated to dryness. The residue is dissolved in methanol, treated with excess ethereal hydrogen chloride and the solution is evaporated in vacuo. The foamy residue is taken up in acetone, 1-(1'-methyl-piperidyl-4')-2-dimethyl-carbamyl - 4 - n-butyl-3,5-dioxo-pyrazolidine hydrochloride—still contaminated with triethylamine hydrochloride—being thereby separated at once. To remove the impurities, the crystalline fraction is heated to 150° in a sublimation apparatus for several hours in a high vacuum, the triethylamine hydrochloride being thus sublimated. The residue is recrystallized from ethanol; 1- (1'-methyl-piperidyl-4') - 2 - dimethyl-carbamyl-4-n-butyl-3,5-dioxo-pyrazolidine hydrochloride

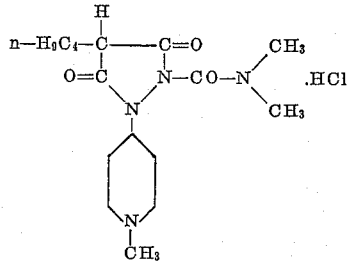

(Id)

crystallizes out as pointed prisms, melting at 225–232° (with decomposition).

*Example 10*

1-(1'-methyl-piperidyl-4') - 4,4 - dimethyl-semicarbazide is first prepared according to the procedure described in the first paragraph of Example 1.

To a solution of 6.93 parts by weight of benzyl-malonyl dichloride in 25 parts by volume of absolute chloroform there is added dropwise and with stirring at 0–10° first a solution of 6 parts by weight of 1-(1'-methyl-piperidyl-4')-4,4-dimethyl-semicarbazide in 25 parts by volume of absolute chloroform and then 8.3 parts by volume of triethylamine. Stirring is continued for another hour at room temperature and the mixture is then boiled under reflux for 4 hours. The chloroform solution is shaken out 3 times with 15 parts by volume of water each time and the aqueous extract is evaporated in vacuo. The residue is dissolved in a little hot isopropanol. On cooling, almost everything crystallizes out after some time. Filtration is effected and the precipitate boiled twice with isopropanol, triethylamine hydrochloride being thus dissolved and subsequently filtered hot. The remaining residue, 1-(1'-methyl-piperidyl-4')-2-dimethyl-carbamyl-4-benzyl-3,5-dioxo-pyrazolidine, is recrystallized from methanol/ether and a mixture of methanol, 10% of water and ether. The compound

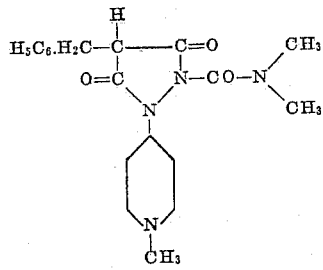

sinters at about 220° and melts at 246–250° (with decomposition).

Having thus disclosed the invention what is claimed is:
1. A member selected from the group consisting of 3,5-dioxo-pyrazolidines of the formula

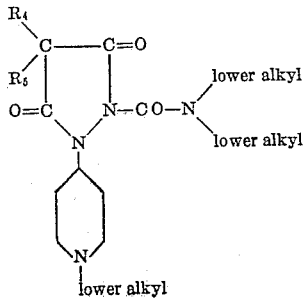

and physiologically acceptable salts thereof with acids, wherein $R_4$ represents a member selected from the group consisting of H, lower alkyl and phenyl, and $R_5$ represents a member selected from the group consisting of lower alkyl, phenyl and benzyl.

2. A 3,5-dioxo-pyrazolidine of the formula

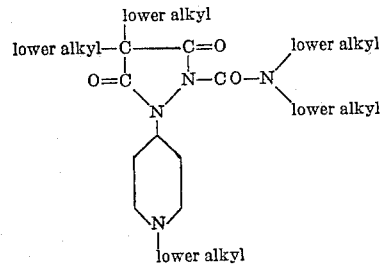

3. 1-(1'-methyl-piperidyl-4')-2-(N-dimethyl-carbamyl)-4,4-diethyl-3,5-dioxo-pyrazolidine.
4. 1-(1'-methyl-piperidyl-4')-2-(N-dimethyl-carbamyl)-4,4-diphenyl-3,5-dioxo-pyrazolidine.
5. 1-(1'-methyl-piperidyl-4')-2-(N-dimethyl-carbamyl)-4,4-dimethyl-3,5-dioxo-pyrazolidine.
6. 1-(1'-methyl-piperidyl-4')-2-(N-dimethyl-carbamyl)-4-n-butyl-3,5-dioxo-pyrazolidine.
7. 1-(1'-methyl-piperidyl-4')-2-(N-dimethyl-carbamyl)-4-benzyl-3,5-dioxo-pyrazolidine.

References Cited in the file of this patent
UNITED STATES PATENTS

| | | |
|---|---|---|
| 2,865,922 | Jucker et al. | Dec. 23, 1958 |
| 2,883,389 | Jucker et al. | Apr. 21, 1959 |

UNITED STATES PATENT OFFICE
Certificate of Correction

Patent No. 2,959,593                                         November 8, 1960

Ernst Jucker et al.

It is hereby certified that error appears in the above numbered patent requiring correction and that the said Letters Patent should read as corrected below.

Column 1, lines 63 to 70, Formula (V) should appear as shown below instead of as in the patent:

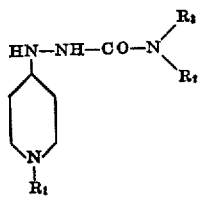

column 3, lines 14 to 21, Formula (Va) should appear as shown below instead of as in the patent:

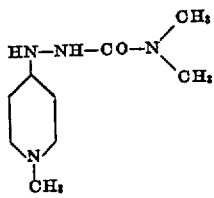

Signed and sealed this 27th day of June 1961.

[SEAL]

Attest:
ERNEST W. SWIDER,
Attesting Officer.

DAVID L. LADD,
Commissioner of Patents.